United States Patent
Engers

[11] Patent Number: 6,095,473
[45] Date of Patent: Aug. 1, 2000

[54] SECURING DEVICE FOR BAGS

[75] Inventor: Stefan Engers, Tettnang, Germany

[73] Assignee: vauDe Sport Albrecht Von Dewitz, Germany

[21] Appl. No.: 09/075,013

[22] Filed: May 8, 1998

[30]   Foreign Application Priority Data

May 9, 1997 [DE] Germany .......................... 197 19 212

[51] Int. Cl.[7] .................................................. B42F 13/00
[52] U.S. Cl. ...................... 248/339; 224/425; 248/316.5; 248/316.7; 248/340
[58] Field of Search .............................. 248/316.5, 316.7, 248/312, 315, 322, 74.1, 339, 340, 309.1, 690, 691, 692, 229.26, 231.81; 224/425, 419, 417, 447, 421, 925, 935

[56]   References Cited

U.S. PATENT DOCUMENTS

| 4,262,829 | 4/1981 | Hine, Jr. et al. ........................... 224/32 |
| 4,638,933 | 1/1987 | Boufford ................................... 224/41 |
| 5,024,359 | 6/1991 | Thomas ..................................... 224/36 |
| 5,083,813 | 1/1992 | Adkins ................................. 248/340 X |
| 5,282,554 | 2/1994 | Thomas ..................................... 224/36 |
| 5,406,816 | 4/1995 | Thomas .................................. 62/457.1 |
| 5,435,471 | 7/1995 | Chuang ...................................... 224/39 |
| 5,618,015 | 4/1997 | Morini .............................. 248/316.5 X |
| 5,673,833 | 10/1997 | Ortlieb ...................................... 224/425 |
| 5,833,195 | 11/1998 | Haynes .................................. 248/316.5 |
| 5,884,372 | 3/1999 | Anscher et al. ......................... 248/339 |

FOREIGN PATENT DOCUMENTS

| 7725672 | 8/1977 | Germany . |
| 8234112 | 5/1983 | Germany . |
| 9207525 | 11/1992 | Germany . |
| 1952108 | 12/1996 | Germany . |

*Primary Examiner*—Ramon O. Ramirez
*Assistant Examiner*—Tan Le
*Attorney, Agent, or Firm*—Robert W. Becker & Associates

[57]   ABSTRACT

A device for detachably connecting a bag to a bar has a securing clip to be attached with a first side to a bag and a load hook pivotably connected to a second side of the securing clip so as to pivot about a pivot axis extending parallel to and above the bar. The load hook, when the bag is connected to the bar, has a locking position in which the load hook engages with an engagement surface across a top side of the bar and locks the bar at the securing clip. A pulling member is connected to the load hook. The load hook is pivoted from the locking position into a release position by the pulling member against a counter force.

21 Claims, 6 Drawing Sheets

SECURING DEVICE FOR BAGS

BACKGROUND OF THE INVENTION

The present invention relates to a device for detachably securing a bag etc. to a bar, for example, the bar of a luggage carrier or the handle bar of a bicycle, comprising a securing clip connectable to the bag and a load hook connected to the securing clip at a side facing away from the bag which engages across the upper area of the bar.

German Gebrauchsmuster 92 07 525.8 shows a securing device for bags to be used in connection with bicycles, motorcycles, etc. The load hook engaging across the top part of the bar is fixedly connected to the securing clip and thus to the bag so that, in order to avoid accidental detachment of the bag when exposed to shock and vibration, an additional snap hook must be provided which is rotatably supported and engages the bar from below. A strap that is connected to the snap hook allows to pivot the snap hook counter to the force of a spring so that, when the snap hook is rotated, the load hook can be opened and the bar can be released in order to remove the bag.

This design requires that the load hook is matched to the respective diameter of the bar, and it is therefore necessary to provide a bag with different load hooks in order to comply with the wishes of the customer. Furthermore, especially when fastening a bag provided with such a securing device it is disadvantageous that the snap hook must be brought into the open position and must be maintained in this position by separately supporting the bag in order to be able to suspend the securing hook from the bar. This makes handling of the bag more difficult and cumbersome. When the spring that acts on the snap hook breaks, a locking is no longer possible because the snap hook is arrested only by the force of the spring. Thus, the bag can easily become detached from the bar when exposed to shock and vibration during driving.

It is therefore an object of the present invention to provide a device of the aforementioned kind for detachably connecting a bag to a bar which not only provides a very simple constructive design and can therefore be produced inexpensively, but can also be manipulated easily whereby it should be ensured reliably that the bag cannot become accidentally detached from the bar. The securing device should not be capable of opening by itself, but secured by the bags' own weight. Fastening of the bag at the bar should be possible without difficulty in a very short period of time.

SUMMARY OF THE INVENTION

The inventive device for detachably connecting a bag to a bar is primarily characterized by:

- a securing clip to be attached with a first side to a bag;
- a load hook pivotably connected to a second side of the securing clip so as to pivot about a pivot axis extending parallel to and above the bar;
- the load hook, when the bag is connected to the bar, having a locking position in which the load hook engages with an engagement surface across a top side of the bar and locks the bar at the securing clip;
- a pulling member connected to the load hook;
- the load hook pivoted from the locking position into a release position by the pulling member against a counter force.

The counter force is preferably the weight force of the bag and/or a spring supported at the load hook.

The bar rests at the engagement surface in the locking position.

The securing clip has essentially a horizontal counter surface positioned opposite the engagement surface in the locking position.

The distance between the engagement surface and the counter surface is equal to or slightly greater than the vertical extension of the bar.

The securing clip has a bolt on which the load hook is pivotably positioned, wherein the bolt extends parallel to and is positioned vertically above the bar in the locking position.

The securing clip has a bolt at which the load hook is pivotably connected, wherein the bolt in the locking position extends parallel to the bar and is positioned on a side of the bar remote from the bag.

Advantageously, the load hook has a first leg and the first leg in the locking position is remote from the bag. The securing clip has an abutment surface, and the first leg comes to rest at the abutment surface when the load hook pivots from the release position into the locking position.

Advantageously, the load hook has a first leg and a second leg. The first leg in the locking position is remote from the bag, and the second leg in the locking position is adjacent to the bag. The securing clip has a first abutment surface and a second abutment surface. The first leg comes to rest at the first abutment surface when the load hook pivots from the release position into the locking position. The second leg comes to rest at the second abutment surface when the load hook pivots from the locking position into the release position.

Preferably, the load hook has a first leg and a second leg whereby the first leg in the locking position is remote from the bag and the second leg in the locking position is adjacent to the bag. The securing clip has an abutment surface and the second leg comes to rest at the abutment surface when the load hook pivots from the locking position into the release position.

Preferably, the securing clip has a cutout in which the load hook is positioned. The cutout is delimited by at least one lateral leg.

The device may further comprise a spring supported between the load hook and the securing clip and acting as the counter force. The securing clip has a bolt and the load hook is pivotably is positioned on the bolt. The spring is also positioned on the bolt. The spring has a first spring leg engaging the load hook and a second spring leg engaging the securing clip.

Preferably, the pulling member is a strap connected to the load hook at a side thereof facing away from the bag.

The load hook is preferably U-shaped and has two parallel legs of identical length. The load hook may be an angle piece having two legs wherein the engagement surface matches an outer mantle surface of the bar.

The load hook is preferably lockable in the locking position.

The device further comprises a locking member pivotably fastened at the securing clip and an actuating member, connected to the locking member. The locking member engages one of the two legs for locking the load hook in the locking position and the locking member is moveable by the actuating member.

The device may comprise a slide and a spring mounted on the securing clip such that the slide is moveable against the force of the spring relative to the securing clip. The load hook has a groove and the slide engages the groove for locking the load hook in the locking position.

According to the present invention, the load hook is connected to the securing clip such that it is pivotable about a pivot axis that extends parallel to the bar and is positioned in the vertical direction at a level substantially above the bar. It can be pivoted by a pulling member counter to the force of a spring supported at the load hook and/or counter to the bag's own weight preferably in a limited pivoting range.

Expediently, the load hook in the upper area comprises at least one engagement surface for support at the bar and the area of the securing clip opposite the engagement surface of the load hook is a substantially horizontally extending counter surface whereby the spacing between the engagement surface of the load hook and the counter surface of the securing clip is identical or slightly greater than the vertical height of the bar.

The load hook can be pivotably connected to the securing clip by a bolt that is inserted into the securing clip and extends parallel to the bar in a position substantially centrally above the bar. However, it is also possible to position the bolt, at which the load hook is pivotably mounted as disclosed above, on a side of the securing clip facing away from the bag substantially at the level of the bar, respectively, slightly above the bar as shown n the drawings.

For limiting the pivoting movement of the load hook, it is suggested to provide an abutment at the leg of the load hook facing away from the bag and/or facing toward the bag, whereby the abutments come to rest at abutment surfaces of the securing clip. The abutment surface may be the counter surface of the securing clip.

The load hook can be inserted into a cutout provided at the securing clip whereby the cutout may be delimited on one or both sides with lateral legs.

It is advantageous to embody the spring acting on the load hook as a leg spring whereby such a spring may be positioned on one or both sides of the load hook between the load hook and the securing clip on the bolt extending therethrough. One leg of the spring is secured at the securing clip and the other leg of the spring is secured at the load hook. The pulling member which is, for example, in the form of a strap can be connected to the side of the load hook facing away from the bag within the outer area of the load hook.

The load hook can have a U-shaped cross-section with two parallel legs having substantially the same length. However, it is also possible to embody the load hook as an angle piece having two legs whereby the inner surface of the angle piece facing the bar has an engagement surface matching the outer mantle surface of the bar.

Preferably, the load hook can be locked in its locking position.

This can be achieved in that the load hook is locked by a locking member in the form of a locking hook or pawl that is pivotably supported at the securing clip and engages behind one of the legs of the load hook. The locking hook or the pawl can be moved by an actuating member connected thereto. However, it is also possible to lock the load hook with a slide which can be moved against the force of a spring within the securing clip whereby the slide engages a groove provided at the load hook.

When a device for detachably connecting a bag is embodied according to the present invention, it is possible to attach the bag provided with the inventive securing device at a bar within a very short period of time. It is only necessary to pivot the load hook by the attached strap, respectively, to release its locking mechanism so that it is pivoted by the force of the spring; the load hook can then be suspended from the bar. The own weight of the bag and/or the force of the spring acting on the load hook pivots and secures the load hook so that in cooperation with the securing clip an accidental automatic release of the bag is essentially impossible. The suggested securing device thus comprises only a few components, is therefore not prone to malfunction, and can be easily manipulated so that it can be used in many ways.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 16.

Figure 1:
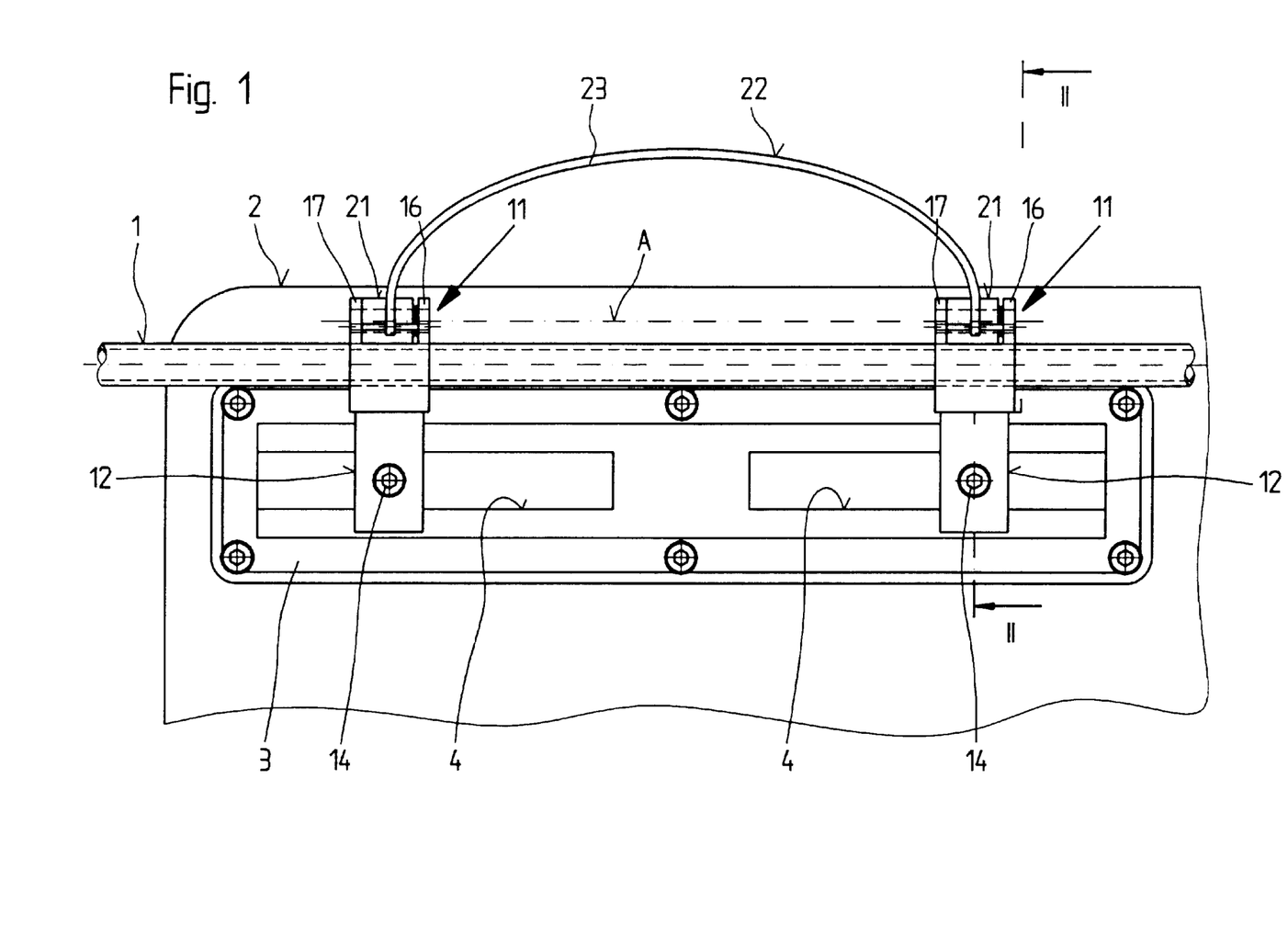
FIG. 1 shows a bag connected to the securing device in a front view.
Figure 2:
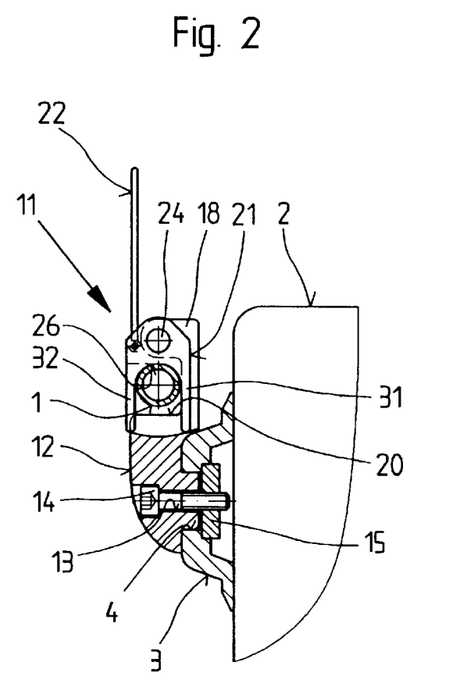
FIG. 2 shows a section along line II—II of FIG. 1.
Figure 3:
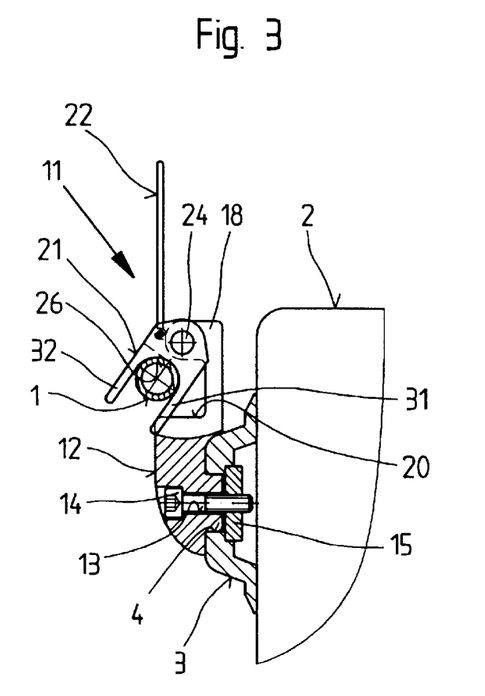
FIG. 3 shows the securing device according to FIG. 2 with the load hook in open position.

The securing device 11 shown in FIGS. 1 through 3 serves for detachably connecting a bag 2 to a bar, for example, the bar of a luggage carrier of a bicycle, and is comprised substantially of two securing clips 12 provided at the bag 2 and load hooks 21 pivotably connected thereto which engage the upper portion of the bar 1. In order to be able to provide for a lateral movement and thus at adaptation to different sizes of carriers, the two securing clips 12 are adjustably guided within a rail provided with grooves 4. The rail 3 is riveted to the bag 2. With the aid of screws 14 which engage bores 13 provided within the securing clips 12 and with nuts 15 supported at the rail 3 the securing clips 12 are secured at the rail 3.

The securing clip 12 according to the design of FIGS. 1 to 3 is embodied in a fork-shaped manner in the area of the load hook 21 and has two lateral legs 16 and 17 which provide a cutout 18 into which the load hook 21 is inserted. With the aid of a bolt 24, which is inserted into bores 19 provided in the two lateral legs 16 and 17 and positioned substantially directly vertically above the bar 1, the load hook 21 having a bore 25 is pivotably supported at the securing clip 12.

The load hook 21 in the embodiment according to FIGS. 1 to 3 is substantially U-shaped in cross-section and receives the bar 1 between its two parallel legs 31 and 32. The distance or surface between the legs 31 and 32 is in the form of an engagement surface 26 for the bar 1 whereby the oppositely arranged surface of the securing clip 12 is its respective counter surface 20. The spacing between the engagement surface 26 and the counter surface 20 corresponds substantially to the diameter of the bar 1 so that, as shown in FIG. 2, the bar 1 is fixed in its position when the securing clip 12 is closed, i.e., the load hook 21 is in its locking position.

Figure 4:
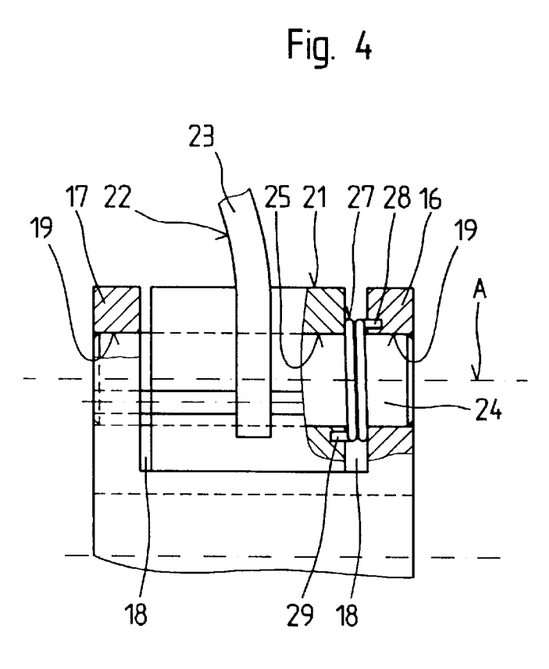
FIG. 4 shows a detail of FIG. 1 in an enlarged representation.

A leg spring 27 is arranged on the bolt 24, as can be seen in FIG. 4, between the leg 16 of the securing clip 12 and the load hook 21. The spring legs 28 and 29 are secured at the leg 16 of the securing clip 12 and at the load hook 21, respectively. The load hook 21 is thus rotatable only by overcoming the force of the spring 27.

A rotation of the load hook 21 can be achieved by the pulling member 22 provided in the form of a strap 23 which is connected to the load hook 21. When, as shown in FIG. 3, a torque is applied to the load hook 21 by the eccentrically arranged pulling member 22, the load hook 21 is rotated or pivoted about the axis A so that the load hook 21 opens and the bag 2 can be removed from the bar 1. When positioning the bag 2, on the bar 1, the bag 2 is only held by the pulling member 22 so that the load hook 21 is opened by the weight force of the bag 2 and the load hook 21 can be suspended from the bar 1. It is also possible to provide a non-represented auxiliary hook at the bag 2 for suspending the bag from a bar of the luggage carrier in order to then pivot the load hook 21 into the open position for suspending it from the bar 1.

Figure 5:
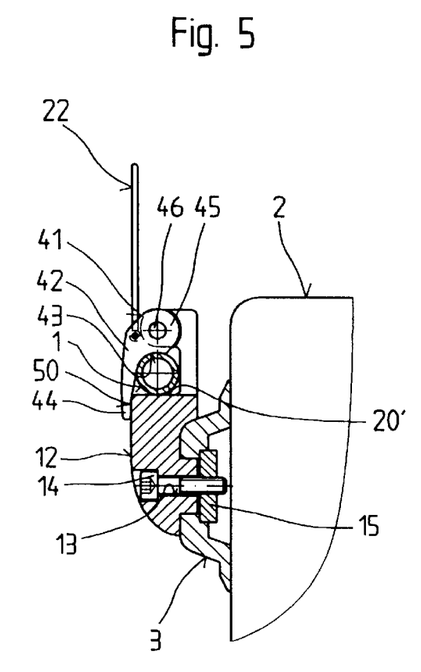
FIGS. 5 to 8 show two embodiment variations of the load hook of the securing device according to FIG. 1 in representations corresponding to FIGS. 2 and 3.
Figure 6:
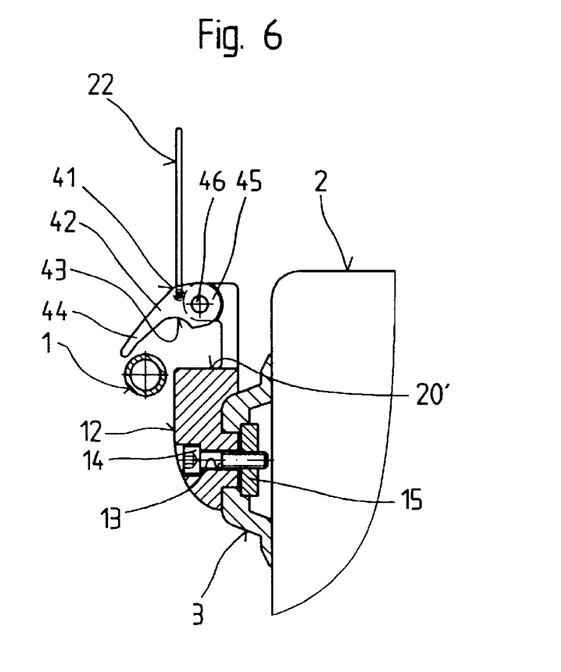

In the embodiment shown in FIGS. 5 and 6, the load hook 41 is an angle piece 42 that is pivotably supported on a bolt 46 inserted into the securing clip 12 and positioned vertically above the bar 1. The angle piece 42 can be pivoted by pulling at the pulling member 22. The end of the leg 44 of the load hook 42 function as an abutment and is forced by a non-represented spring acting on the load hook 41 onto an abutment surface 50 which is provided at the securing clip 12. The leg 45 receives the bolt 46. The area between the two legs 44 and 45 is in the form of an engagement surface 43 for the bar 1. The load hook 41 can be pivoted according to FIG. 6 counter to the force of the spring arranged at the bolt 46 in order to be able to suspend the securing clip 12 from the bar 1 or to remove the bag 2 from the bar. The spacing between the engagement surface 43 and the counter surface 20' provided at the securing clip 12 corresponds to the diameter of the bar 1 such that, when the load hook 41 is in its locking position, the bar 1 is securely arrested in its position.

Figure 7:
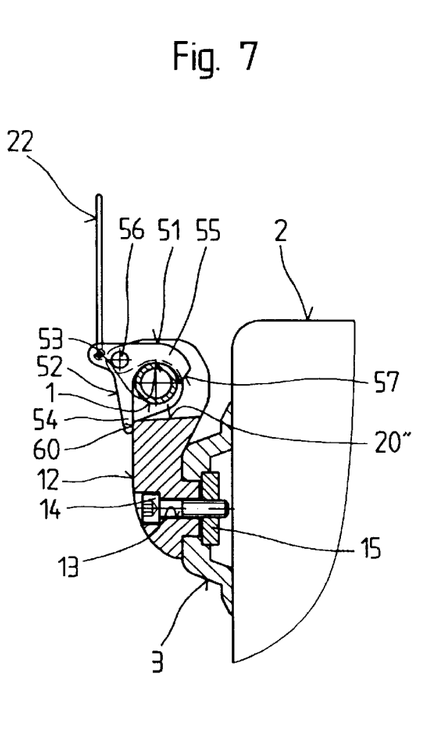
Figure 8:
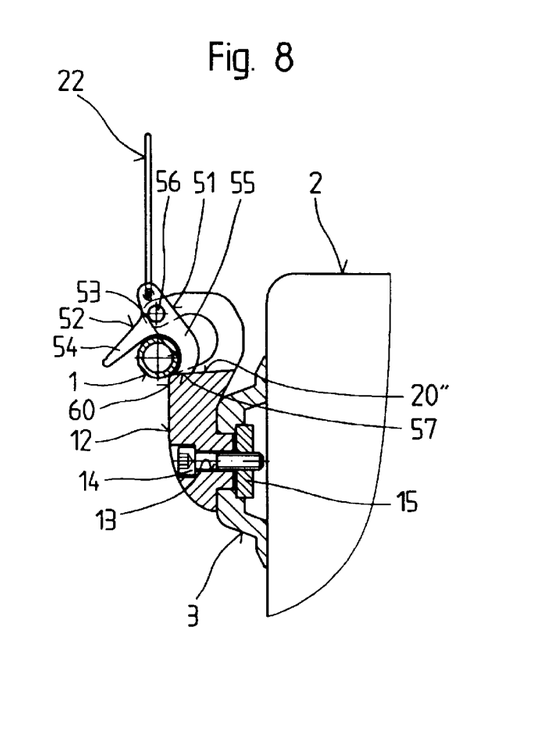
Figure 9:
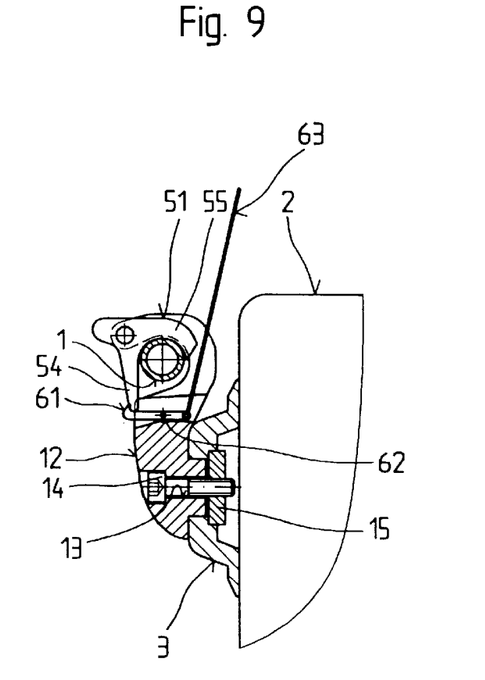
FIGS. 9 to 14 show load hooks, that can be locked by differently embodied locking members, in representations according to FIGS. 2 and 3.
Figure 10:
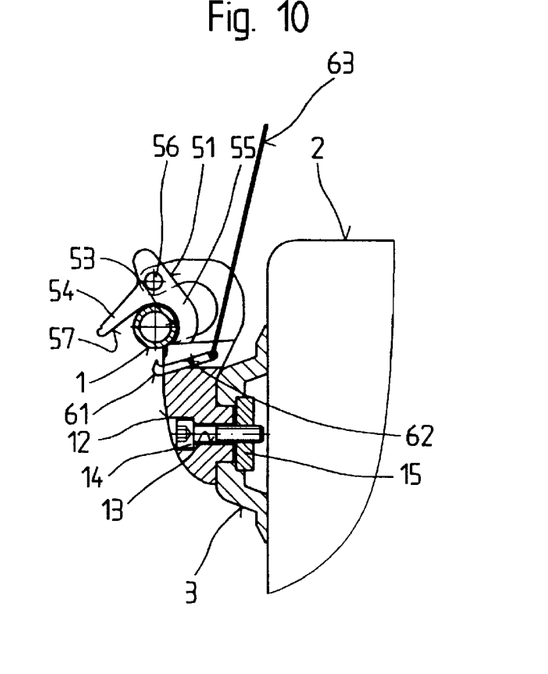
Figure 11:
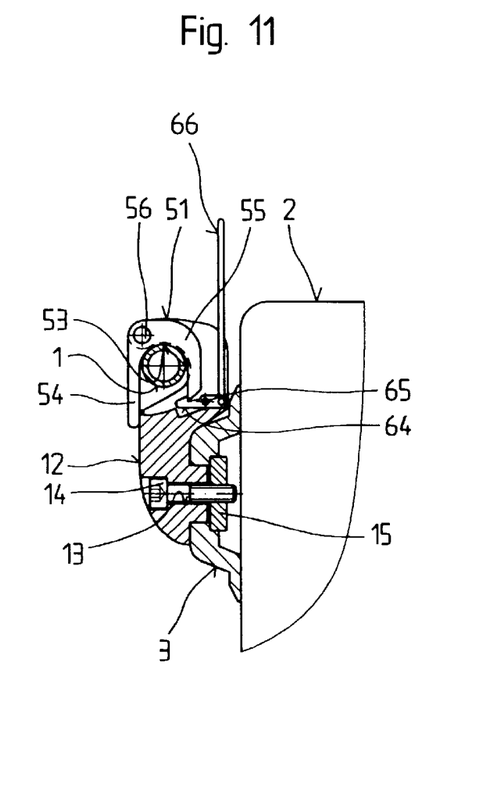
Figure 12:
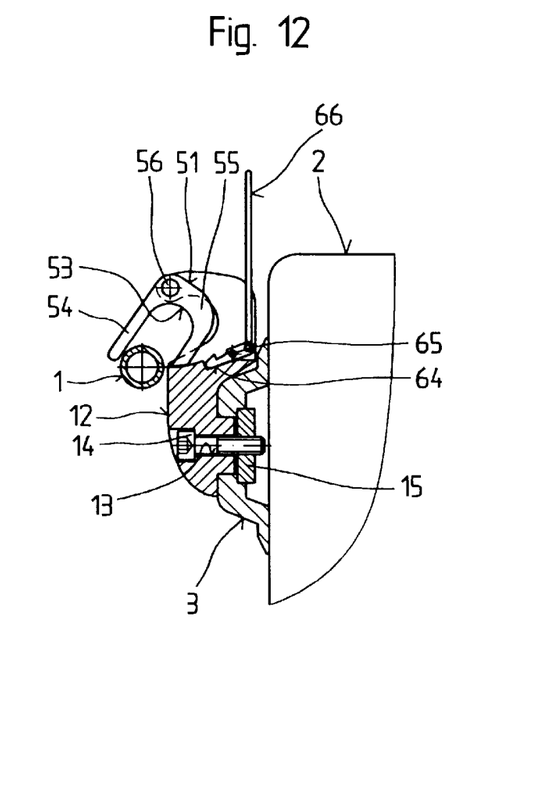
Figure 13:
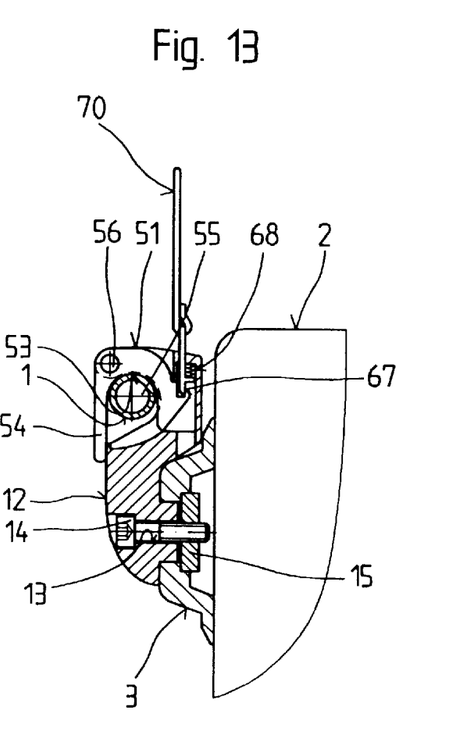
Figure 14:
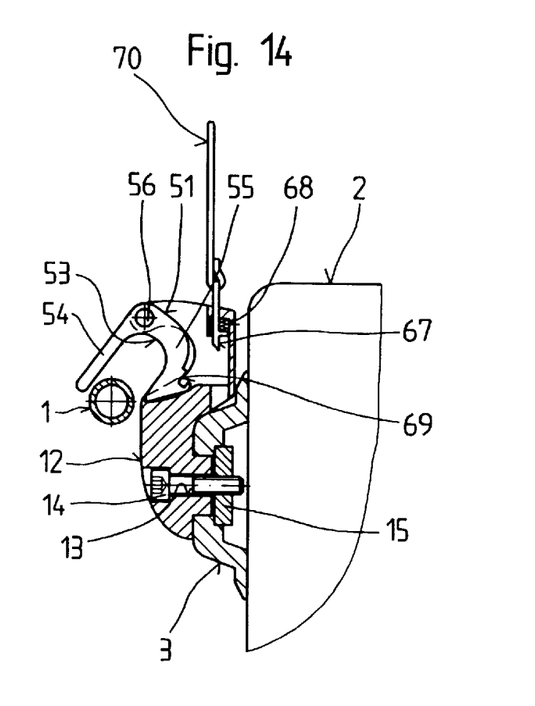

The load hook 51 shown in the embodiment of FIGS. 7 and 8 is embodied in the same manner as the one disclosed above. The bolt 56 for rotatably supporting the load hook 51 counter to the force of a non-represented spring (the spring is optional) is arranged adjacent to the bar 1 within the leg 54 of the angle piece 52, and the inner mantle surface of the leg 55 provides the engagement surface 53 for the bar 1. When the load hook 51 is in its open (release) position, the leg 55 with its end forming an abutment 57 rests at the counter surface 22" provided at the securing clip 12. When the load hook 51 is in its locking position, the end of the leg 54 forms an abutment and cooperates with the abutment surface 60 provided at the securing clip 12 so that the load hook 51 is secured in both end positions (release position, locking position).

In the embodiments according to FIGS. 9 through 14, the load hook 51 is lockable in various manners when the bag 2 is suspended from the bar 1. According to the embodiment of FIGS. 9 and 10, a locking member in the form of a locking hook 61 is pivotably supported on a bolt 62 within the securing clip 12. It can be pivoted by a connected actuating member 63 in order to cooperate with the leg 54 of the load hook 51. According to FIGS. 11 and 12, for the same purpose a locking member in the form of a pawl 64 is provided which can also be pivoted by the action of an actuating member 66 about bolt 65. The pawl 64 cooperates with the leg 55 of the load hook 51. In the embodiment according to FIGS. 13 and 14, the load hook 51 is locked by a slide 67 which engages a groove 69 provided within the load hook 51 and which is moved by an actuating member 70 counter to the force of the spring 68 in order to release the locking action.

Figure 15:
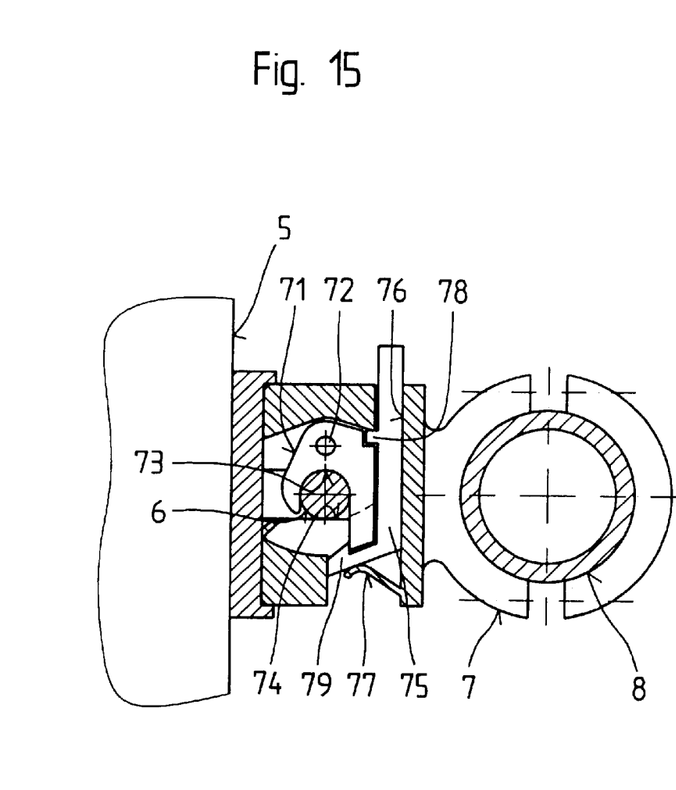
FIGS. 15 and 16 show a load hook in two operational positions, whereby the load hook is connected to an adaptor.
Figure 16:
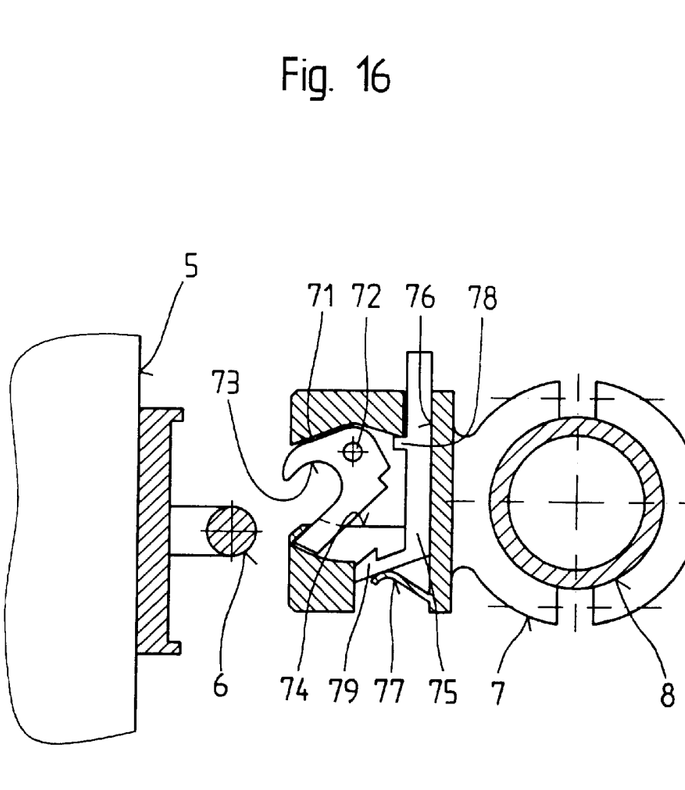

In the embodiment according to FIGS. 15 and 16, the load hook 71 is connected to an adaptor 7 that function as a securing clip to be connected to a vertically extending bar 8 of a carrier in order to connect to the bar 8 a bag 5 provided with a connector 6. The load hook 71 is pivotable about bolt 72 which is positioned within the adaptor 7 and can be locked by a slide 75. The slide 75, which is guided in a groove 76 and can be moved counter to the force of a leaf spring 77, has a follower 78 and a pawl 79 which cooperate with the load hook 71.

A non-represented spring is arranged on the bolt 72 and acts on the load hook 71 so that upon insertion of the connector 6 into the load hook 71 and by pressing against the engagement surface 73 having coordinated therewith a counter surface 74 at the adaptor 7, the load hook 71 is pivoted and the locking member 75 moved counter to the force of the spring 77 to such an extent that the load hook 71 engages the pawl 79. When pressure is applied to the slide 71, the load hook 71 is released and the bag 5 can be removed from the adaptor 7 or can be suspended from the load hook 71.

The specification incorporates by reference the disclosure of German priority document 197 19 212.2 of May 9, 1997.

The present invention is, of course, in no way restricted to the specific disclosure of the specification and drawings, but also encompasses any modifications within the scope of the appended claims.

What is claimed is:

1. A device for detachably connecting a bag to a bar, said device comprising:

a securing clip to be attached with a first side to a bag;

a load hook for engaging an upper portion of a bar to suspend the bag from the bar;

said load hook pivotably connected to a second side of said securing clip so as to pivot about a pivot axis extending parallel to and above the bar;

said load hook, when the bag is suspended from the bar, having a locking position in which said load hook engages with an engagement surface across a top side of the bar and locks the bar at said securing clip;

a pulling member connected to said load hook;

said load hook pivoted from said locking position into a release position by said pulling member against a counter force.

2. A device according to claim 1, wherein said counter force is a weight force of the bag.

3. A device according to claim 1, comprising a spring supported at said load hook acting as said counter force.

4. A device according to claim 1, comprising a spring supported at said load hook, wherein said spring and a weight force of the bag act as said counter force.

5. A device according to claim 1, wherein the bar rests at said engagement surface in said locking position.

6. A device according to claim 5, wherein said securing clip has an essentially horizontal counter surface positioned opposite said engagement surface in said locking position.

7. A device according to claim 6, wherein a distance between said engagement surface and said counter surface is equal to or slightly greater than a vertical extension of the bar.

8. A device according to claim 1, wherein said securing clip has a bolt on which said load hook is pivotably positioned, wherein said bolt extends parallel to and is positioned vertically above the bar in said locking position.

9. A device according to claim 1, wherein said securing clip has a bolt at which said load hook is pivotably connected, wherein said bolt, in said locking position, extends parallel to the bar and is positioned on a side of the bar remote from the bag.

10. A device according to claim 1, wherein:

said load hook has a first leg;

said first leg in said locking position is remote from the bag;

said securing clip has an abutment surface; and said first leg comes to rest at said abutment surface when said load hook from said release position into said locking position.

11. A device according to claim 1, wherein:

said load hook has a first leg and a second leg;

said first leg in said locking position is remote from the bag and said second leg in said locking position is adjacent to the bag;

said securing clip has a first abutment surface and a second abutment surface;

said first leg comes to rest at said first abutment surfaces when said load hook pivots from said release position into said locking position; and said second leg comes to rest at said second abutment surface when said load hook pivots from said locking position into said release position.

12. A device according to claim 1, wherein:

said load hook has a first leg and a second leg;

said first leg in said locking position is remote from the bag and said second leg in said locking position is adjacent to the bag;

said securing clip has an abutment surface; and said second leg comes to rest at said abutment surface when said load hook pivots from said locking position into said release position.

13. A device according to claim 1, wherein said securing clip has a cutout in which said load hook is positioned.

14. A device according to claim 13, wherein said cutout is delimited by at least one lateral leg.

15. A device according to claim 1, further comprising a spring supported between said load hook and said securing clip and acting as said counter force, wherein said securing clip has a bolt, wherein said load hook is pivotably positioned on said bolt and said spring is positioned on said bolt, said spring having a first spring leg engaging said load hook and a second spring leg engaging said securing clip.

16. A device according to claim 1, wherein said pulling member is a strap connected to said load hook at a side thereof facing away from the bag.

17. A device according to claim 1, wherein said load hook is U-shaped and has two parallel legs of identical length.

18. A device according to claim 1, wherein said load hook is an angle piece having two legs, wherein said engagement surface matches an outer mantle surface of the bar.

19. A device according to claim 18, wherein said load hook is lockable in said locking position.

20. A device according to claim 19, further comprising a locking member pivotably fastened at said securing clip and an actuating member connected to said locking member, wherein said locking member engages one of said two legs for locking said load hook in said locking position, and wherein said locking member is moveable by said actuating member.

21. A device according to claim 19, further comprising a slide and a spring mounted on said securing clip such that said slide is moveable against a force of said spring relative to said securing clip, wherein said load hook has a groove, and wherein said slide engages said groove for locking said load hook in said locking position.

* * * * *